United States Patent [19]

Ohmori et al.

[11] 4,287,505
[45] Sep. 1, 1981

[54] TROUBLE DIAGNOSING DEVICE OF CONTROL CIRCUIT SYSTEM

[75] Inventors: Taiji Ohmori, Kawagoe; Makoto Sato, Kamifukuoka; Yoshikazu Tsuchiya, Kawagoe, all of Japan

[73] Assignee: Honda Giken Kogyo Kabushiki Kaisha, Tokyo, Japan

[21] Appl. No.: 58,376

[22] Filed: Jul. 17, 1979

[30] Foreign Application Priority Data

Jul. 21, 1978 [JP] Japan .................................. 53-89266
Feb. 19, 1979 [JP] Japan .................................. 54-18082

[51] Int. Cl.³ .............................................. B60T 17/22
[52] U.S. Cl. ..................................... 340/52 B; 303/92
[58] Field of Search ................. 340/52 R, 52 A, 52 B, 340/52 C, 52 F; 303/92, 94, 95, 106

[56] References Cited

U.S. PATENT DOCUMENTS

| 4,047,149 | 9/1977 | Akita et al. | 340/52 B |
| 4,085,979 | 4/1978 | Leiber et al. | 340/52 B |
| 4,106,820 | 8/1978 | Ruhnau et al. | 340/52 B |

*Primary Examiner*—Alvin H. Waring
*Attorney, Agent, or Firm*—Haseltine and Lake

[57] ABSTRACT

A trouble diagnosing device of a control circuit for receiving, as input signals, signals containing information on controlled means and producing, as output signals, control signals for controlling the controlled means on the basis of the input signals, includes modulator means for modulating the input signals by means of a modulation signal having a trouble diagnosing discrimination waveform, and a trouble diagnosing circuit for producing an output signal indicating trouble in the control circuit system when the output signals of said control circuit systems produced upon receipt of the input signals modulated by the modulator means, contain an abnormal signal.

In an embodiment of the invention, the modulator means modulate input signals by means of a trouble diagnosing modulation signal having such a small pulse width that electromagnetic actuators for controlling the controlled means are not able to respond thereto.

In another embodiment of the invention, the trouble diagnosing circuit is equipped with a circuit for producing a discrimination waveform signal solely depended on the starting points of the discrimination waveforms of the modulation signals and on the starting points of the discrimination waveforms of the control signals so that trouble in the control circuit system having various waveform signals can be diagnosed without being restricted by waveforms subsequent to the starting points of the modulation signals and control signals.

10 Claims, 17 Drawing Figures

TROUBLE DIAGNOSING DEVICE OF CONTROL CIRCUIT SYSTEM

BACKGROUND OF THE INVENTION

This invention relates to a trouble diagnosing device of a control system for feeding to an actuator means, control signals for actuating the actuator means so as to maintain operation of controlled means in proper conditions.

When a system producing control signals for actuating actuator means, that controls the operation of a controlled means so as to bring it in a proper operation condition, is out of order for one reason or another, the control signals at the output of the control circuit system are fed to the actuator means in the form of incorrect signals. Consequently, the actuator means executes incorrect action on the basis of the incorrect signals and possibly causes various problems. In order to prevent in advance the incorrect action of the actuator means on the basis of the incorrect signals, it is necessary to diagnose trouble in the control system from time to time, and to immediately take appropriate corrective action as soon as such trouble is detected.

In making diagnosis of trouble in the control system and electromagnetic actuators in a control system wherein the electromagnetic actuators are so constructed as to control operation of controlled means on the basis of the control signals fed from the control circuit, it may be possible to make a diagnosis of them by feeding an analog signal having a predetermined signal waveform to the control circuit and to the electromagnetic actuators and detecting an abnormality of an output signal taken from the control circuit or the electromagnetic actuators at that time.

In this case, if an analog signal is fed to the control circuit and to the electromagnetic actuators during their operation, this analog signal mutually interferes with a normal signal and puts the control circuit or the electromagnetic actuators out of order so that the controlled means makes the wrong action and invites various troubles. For this reason it seems necessary to first cut off the feed of the normal signal in diagnosing the control circuit and the electromagnetic actuators, and then feed them the analog signal. In this instance, however, it is necessary to separately provide a signal cut-off device and a signal change device which leads to a further complication of the apparatus as a whole and to inevitable lowering of realibility. This trend is specifically remarkable when the control device includes a plurality of control systems of the same kind operating in paralled to one another.

Incidentally, trouble modes of the control circuit system may broadly be divided into the following two groups; one being the trouble of the type wherein the control signal waveforms required for actuating the actuator means are not at all formed and the other being the trouble of the type wherein, through the control signal waveforms required for actuating the actuator means are actually formed and remain even when it becomes necessary to stop operation of the actuator means. Various devices may be prepared as an apparatus for diagnosing trouble in such a control system, but none of the conventional trouble diagnosing devices has been able to make easy diagnosis of the control system without hindering the operation of the actuator means and to satisfy the requirements of simple construction and high utility.

SUMMARY OF THE INVENTION

It is therefore a primary object of the present invention to obtain a trouble diagnosing device for diagnosing trouble in a control system including a control circuit and electromagnetic actuators for controlling operations of a plurality of controlled means, the controlled means being of the same kind with each other and operating in parallel to each other, the trouble diagnosing device having a simple construction and high reliability and capable of optionally diagnosing trouble in the control circuit and in electromagnetic actuators whether or not they are operating, or without causing any wrong action of the controlled means and without specifically calling for the use of a signal cut-off device and a signal switch device, by feeding for a predetermined time interval a trouble diagnosing modulation signal having such a narrow pulse width that the electromagnetic actuators are not able to respond thereto.

It is another object of the present invention to obtain a trouble diagnosing device of the character as described having a high utility and capable of reliably and simultaneously diagnosing a plurality of control system of the same kind with each other.

Briefly, the invention contemplates a trouble diagnosing device in a control system. The trouble diagnosing device diagnoses trouble in a control circuit or in an electromagnetic actuator wherein said control circuit receives an input signal representative of information about a controlled means which is controlled by the electromagnetic actuator and transmits a controlling signal to the electromagnetic actuator for controlling the operation of the controlled means. The trouble diagnosing device includes: a modulation signal oscillator means for feeding to the input side of the control circuit a trouble diagnosing signal having such a narrow pulse width that the electromagnetic actuator is not able to respond thereto, the trouble diagnosis signal being independent of the input signal related to the controlled means; input signal modulator means for modulating the input signal related to the controlled means by the trouble diagnosing signal to produce a modulation signal; and a trouble diagnosing circuit means for producing output signals indicating trouble in the control circuit or in the electromagnetic actuator when the control circuit or the electromagnetic actuator receives the modulation signal from said input signal modulator and in response thereto emits a signal having other than a predetermined waveform.

BRIEF DESCRIPTION OF THE DRAWINGS

In the accompanying drawings:

FIGS. 3a, 3b and 3c show signal waveforms when wheel speed signals as normal input signals are modulated by a trouble diagnosing signal, respectively, wherein;

FIG. 3a shows waveforms of the wheel speed signals;

DESCRIPTION OF THE PREFERRED EMBODIMENTS

Hereinafter, the trouble diagnosing apparatus in accordance with the present invention will be explained with reference to an embodiment applied to an anti-skid brake device for a vehicle.

Figure 1:
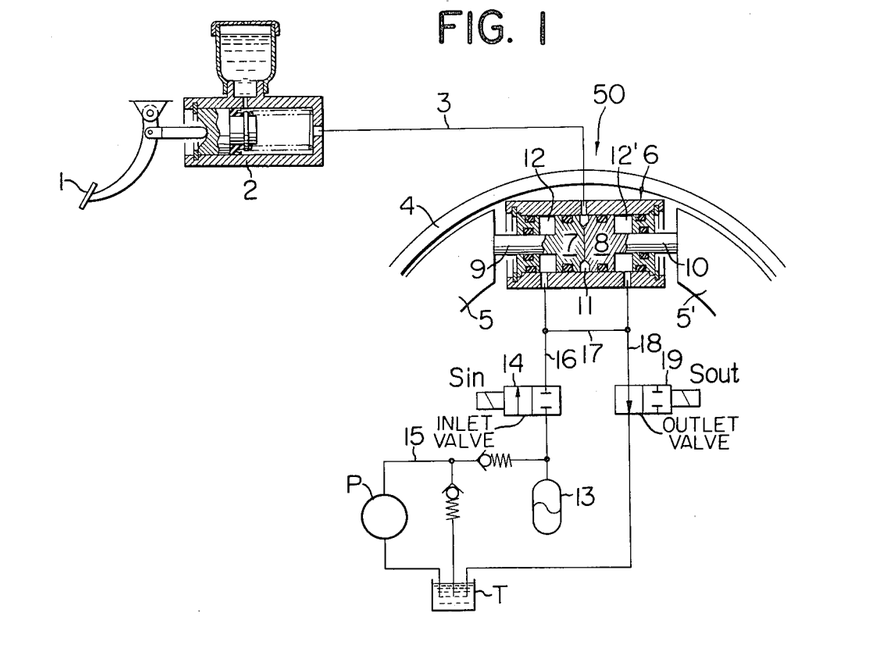
FIG. 1 is a diagrammatic illustration showing the principal portions of one embodiment of a braking system for a vehicle and one embodiment of a control system for controlling the operation of the braking system.

Referring initially to FIG. 1, a brake pedal 1 is operatively connected to a master cylinder 2, and when the driver steps on the brake pedal 1, the master cylinder 2 produces a braking oil pressure. The master cylinder 2 communicates through an oil passage 3 with a braking oil chamber 11 defined between a pair of pistons 7 and 8 within a wheel cylinder 6, which is mounted on a vehicle body, in a braking device 50 disposed on each of at least two wheels. The pistons 7 and 8 have respective rods 9 and 10 which extend outwardly through the end wall of wheel cylinder 6. The rods 9 and 10 have their outer ends connected to brake shoes 5, 5' which can be brought into contact with a brake drum 4 mounted in the wheel thereby to produce the braking torque. Thus, when the brake pedal 1 is stepped on so that the master cylinder 2 produces the braking oil pressure, this braking oil pressure is transmitted into the braking oil chamber 11 in each braking device 50 via the oil passage 3. As a result, the pistons 7 and 8 are urged away from each other and consequently, the brake shoes 5, 5' are urged against the frictional surface of the brake drum 4 to produce braking torque in cooperation with the brake drum 4 on the wheels.

If the braking oil pressure within the braking oil chamber 11 is too great, the braking torque produced between each of the brake shoes 5, 5' and the brake drum 4 becomes excessive, the wheels are brought into a locked state, i.e., the "brakes lock". In order to prevent such a dangerous state, a pair of control oil chambers 12, 12' are defined between each of pistons 7, 8 and the opposite end wall of the wheel cylinder 6. The control oil pressure within these control oil chambers 12, 12' may be controlled so that when any possibility or danger of locking the wheels due to excessively large braking oil pressure within the braking oil chamber 11 occurs, movement of the piston 7 and 8 arising from the braking oil pressure may be restrained.

Next, an explanation will be given for the control device for controlling the control oil pressure within the control oil chambers 12 and 12'. The control oil pumped up and then pressurized by a pump P from an oil tank T is fed through an oil passage 15 and a pressure accumulator 13 to a port on the inlet side of an inlet valve 14 constituting controlled means which is actuated by an electromagnetic actuator $S_{in}$. A port on the outlet side of the inlet valve 14 communicates with the control oil chamber 12 through an oil passage 16 and with the control oil chamber 12' through an oil passage 17, respectively. The control oil chamber 12 is connected with a port on the inlet side of an outlet valve 19 constituting controlled means which is actuated by an electromagnetic actuator $S_{out}$, through the oil passage 16, oil passage 17 and oil passage 18. The control oil chamber 12' is also connected with the port on the inlet side of the outlet valve 19 through the oil passage 18. A port on the outlet side of the outlet valve 19 is connected with the oil tank T.

The inlet valve 14 is normally held in a position displaced to the right in FIG. 1 (as shown), in which position the control oil chambers 12, 12' are cut off from the pump P and the pressure accumulator 13. When the electromagnetic actuator $S_{in}$ is electrically energized to operate the inlet valve 14, the inlet valve 14 is displaced to the left in FIG. 1 and as a result, the control oil fed from the pump P is fed under pressure into the control oil chambers 12, 12' through the accumulator 13 and inlet valve 14 to urge the pistons 7 and 8 to approach each other against the pressure of the braking oil within the braking oil chamber 11.

The outlet valve 19 is normally held in a position displaced to the left in FIG. 1 (as shown), in which position the control oil chambers 12, 12' are connected to the oil tank T through the outlet valve 19. When the electromagnetic actuator $S_{out}$ is electrically energized to operate the outlet valve 19, the outlet valve 19 is displaced to the right in FIG. 1 and the control oil chambers 12, 12' are cut off from the oil tank T.

In a first case wherein neither of the electromagnetic actuators $S_{in}$ and $S_{out}$ is energized and both the inlet valve 14 and outlet valve 19 are in an inoperative state in which the inlet valve 14 is in the right position and the outlet valve 19 is in the left position, the control oil chambers 12, 12' are open to the oil tank T and hence, the pistons 7 and 8 are moved only by the braking oil pressure within the braking oil chamber 11. As a consequence, the braking torque at the time of braking increases freely in accordance with the braking action of the driver.

In the second state only the electromagnetic actuator $S_{out}$ is energized to operate the outlet valve 19 so that the latter is displaced to the right position, the control oil chambers 12, 12' are cut off from the oil tank T to place the control oil within the control oil chambers 12, 12' in a locked state. Thus, even if the braking oil pressure within the braking oil chamber 11 continues to increase, further movement of the pistons 7 and 8 is held in check. As a result, the braking torque at the time of braking is limited to a given magnitude irrespective of the braking action of the driver, and thus, the aforementioned second state is adapted to the case in which the possibility of locking of the wheel occurs.

In the third state wherein both electromagnetic actuators $S_{in}$ and $S_{out}$ are energized to operate both inlet valve 14 and outlet valve 19 so that the inlet valve 14 is displaced to the left and the output valve 19 is displaced to the right position, control oil fed from the pump P is fed under pressure into the control oil chambers 12, 12' through the accumulator 13 and inlet valve 14, and the control oil chambers 12, 12' are cut off from the oil tank T. Consequently, the pistons 7 and 8 approach each other against the control oil pressure inside the control oil chambers and the braking torque at the time of braking decreases irrespective of the braking action of the driver and thus, this third state is adapted for the case in which the danger of locking of the wheels occurs.

Figure 2:
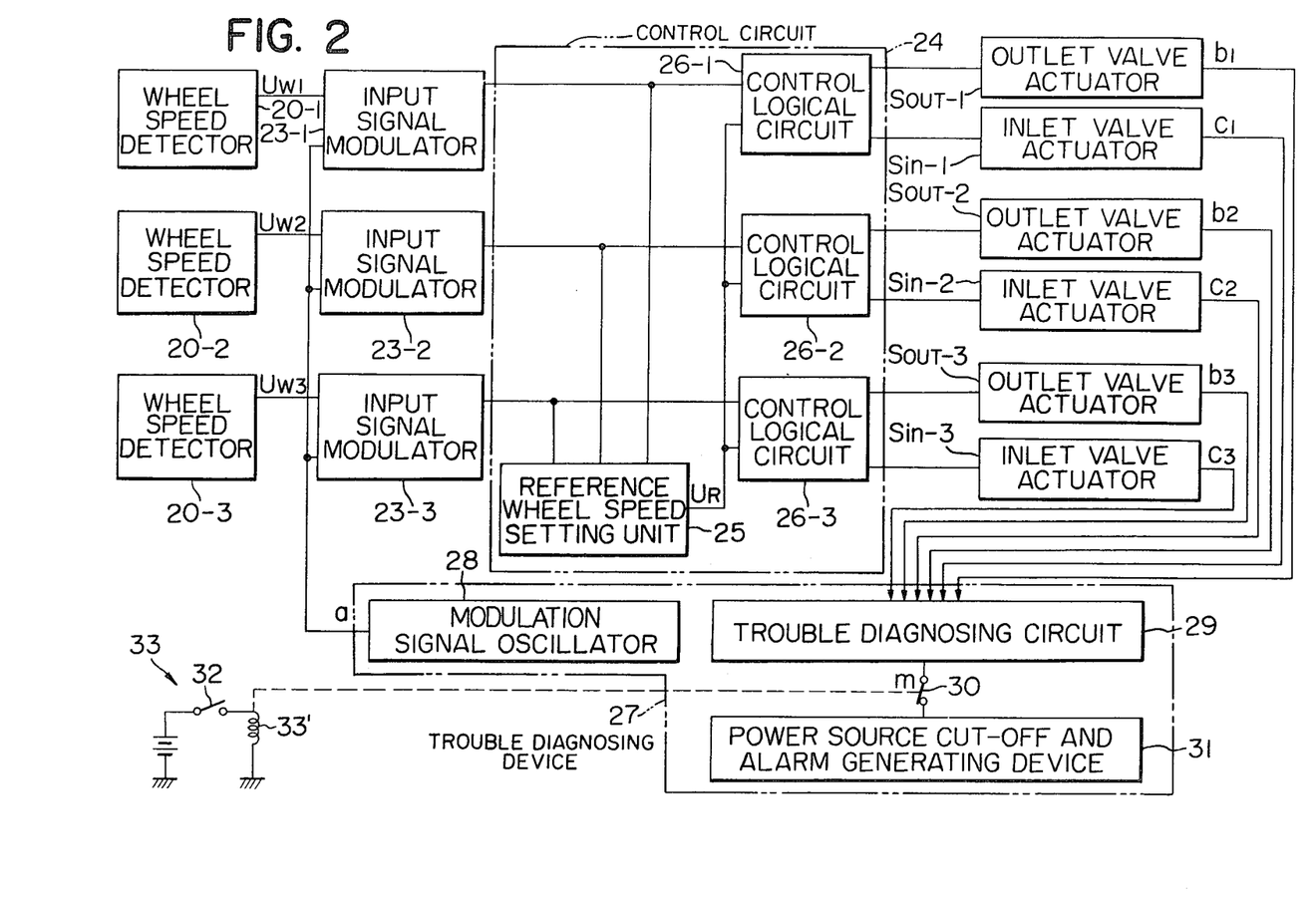
FIG. 2 is a block diagram showing one embodiment of a control circuit, to which the trouble diagnosing device of the present invention is applied, for operating the control system shown in FIG. 1.

FIG. 2 shows one embodiment of an anti-skid control system having three independent control circuits, and one embodiment of a trouble diagnosing device 27 adapted for diagnosing each control circuits.

The anti-skid control system will first be explained. Three wheel speed detectors 20-1, 20-2 and 20-3 respectively detect the peripheral speed of first, second and third wheels and then feed wheel speed signals $U_{w1}$, $U_{w2}$ and $U_{w3}$ proportional to the peripheral speeds of the wheels to the control circuit 24 through input signal modulators 23-1, 23-2 and 23-3, respectively. In this case, the wheel speed detectors 20-1, 20-2 and 20-3 each include a frequency-voltage converter, in which when the speed signal of each wheel detected is a frequency signal. This signal is converted into an easily controllable voltage signal which is generated as an output signal.

The control circuit 24 comprises a single reference wheel speed setting unit 25 and three control logical circuits 26-1, 26-2 and 26-3 one for each of the corresponding wheel. The reference wheel speed setting unit 25 is designed to receive wheel speed signals $U_{w1}$, $U_{w2}$ and $U_{w3}$ as input signals, and the vehicle speed U is estimated from these three wheel speed signals $U_{w1}$, $U_{w2}$ and $U_{w3}$. Then a reference wheel speed is set on the basis of the vehicle speed U and a reference wheel speed signal $U_R$ of value in proportion to the reference wheel speed is fed as an output signal to the control logical circuits 26-1, 26-2 and 26-3.

The control logical circuits 26-1, 26-2 and 26-3 are designed to receive, as input signals, corresponding wheel speed signals $U_{w1}$, $U_{w2}$ and $U_{w3}$ and the reference wheel speed signal $U_R$ fed from the reference wheel speed setting unit 25. These signals are subjected to a logical operation to generate, as output signals, output valve actuating signals adapted to energize electromagnetic actuators $S_{out-1}$, $S_{out-2}$ and $S_{out-3}$ for actuating the three outlet valves 19 (FIG. 1) corresponding to the respective wheels and inlet valve actuating signals adapted to energize electromagnetic actuators $S_{in-1}$, $S_{in-2}$ and $S_{in-3}$ for actuating the three inlet valves 14 (FIG. 1) corresponding to the respective wheels. In this case, for example, when there is no possibility of danger of locking of the wheel j (j=1, 2, 3 in FIG. 1), neither outlet valve actuating signal nor inlet valve actuating signal is produced. When there occurs a possibility of locking of the wheel j, only the outlet valve actuating signal is produced; and when there is the likelihood of locking of the wheel j, both the outlet valve actuating signal and the inlet valve actuating signal are produced.

Next, the trouble diagnosing device 27 will be explained. The trouble diagnosing device shown in FIG. 2 comprises a modulation signal oscillator 28 which produces a modulation signal a and is connected to the reference wheel speed setting unit 25 and to input sides of the control logical circuits 26-1, 26-2 and 26-3 through the input signal modulators 23-1, 23-2 and 23-3. The device 27 further comprises a trouble diagnosing circuit 29 which receives, as input signals, outlet valve electromagnetic coil voltage signals $b_1$, $b_2$, $b_3$ produced on the basis of output signals of the control logical circuits 26-1, 26-2 and 26-3 and inlet valve electromagnetic coil voltage signals $c_1$, $c_2$ and $c_3$ to produce a single output signal m. The device 27 also includes a power source cut-off and alarm generating device 31 whose input is connected to the output of the trouble diagnosing circuit 29 through a normally-closed contact 30 which is closed at the time of non-braking and opened at the time of braking by the action of a relay switch 33. When the output signal m of the trouble diagnosing circuit 29 takes an abnormal waveform due to a failure of the operation of the control logical circuit 24 or of the electromagnetic actuators $S_{in-1, 2, 3}$ and $S_{out-1, 2, 3}$, this device 31 cuts off the power source of the circuit 24 to provide a state in which braking is freely applied to the wheels and to generate an alarm.

The response characteristics of each of the electromagnetic actuators $S_{out-1, 2, 3}$ and $S_{in-1, 2, 3}$ with respect to an input signal is restricted in its operation speed and hence, with respect to an input signal having a pulse width narrower than a given pulse width, each actuator makes no response even when a voltage is produced in its electromagnetic coil.

Figure 3A:
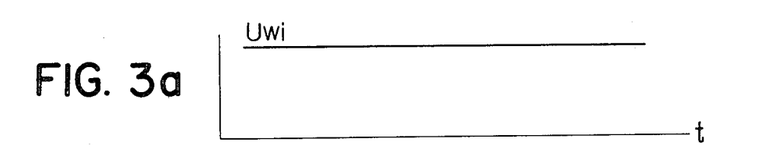
Figure 3B:
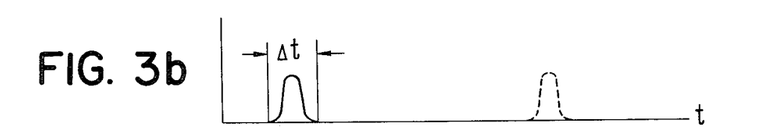
FIG. 3b shows waveforms of the modulation signal
Figure 3C:
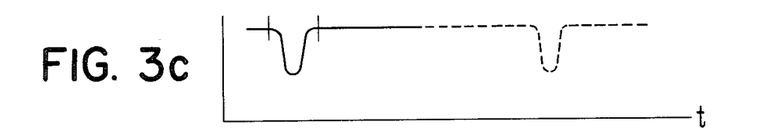
FIG. 3c shows waveforms of the signals after modulation.

During normal running of the vehicle, when a wheel speed signal $U_{wi}$ (i=1, 2, 3) in the form of an output signal of the wheel speed detector 20-i (i=1, 2, 3) such as shown in FIG. 3a, is subtracted by a modulation signal having a waveform similar to one cycle of a high frequency sine wave in the width $\Delta t$ but with no discontinuity and repeating within a given time interval like a waveform shown in FIG. 3b, there is produced a signal having repeating waveforms such as shown in FIG. 3c.

Figure 4:
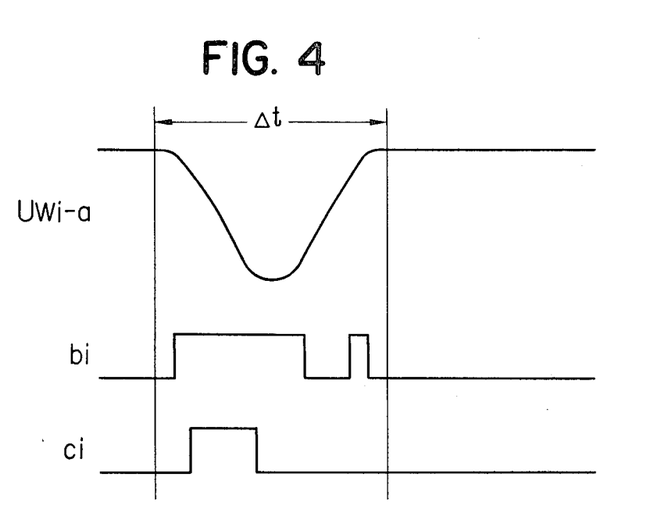
FIG. 4 shows an example of a waveform of a wheel speed signal and examples of waveforms of an outlet valve electromagnetic coil voltage signal and inlet valve electromagnetic coil voltage signal that are obtained by the wheel speed signal.

The modulation signal a generated by the modulation signal oscillator 28 has a waveform such as shown in FIG. 3b which is similar to one cycle of a high frequency sine waveform, is free from discontinuity and repeats at a given time interval. When the modulation signal a is fed to the reference wheel speed setting unit 25 and to the control logic circuits 26-1, 26-2, 26-3 through the input signal modulators 23-1, 23-2 and 23-3 forming a subtraction circuit, the control logical circuits 26-1, 26-2 and 26-3 produce an outlet valve electromagnetic coil voltage signal $b_i$ (i=1, 2, 3) and an inlet valve electromagnetic coil voltage signal $c_i$ (i=1, 2, 3), each having a rectangular waveform as shown in FIG. 4.

Figure 5A:
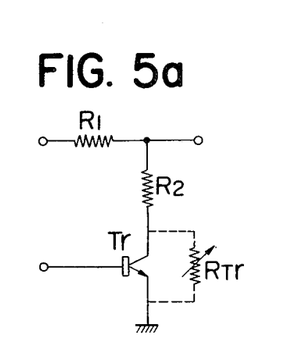
FIGS. 5a and 5b are circuit diagrams showing embodiments of an input signal modulator, respectively.

FIGS. 5a and 5b shows embodiments of an input signal modulator forming the operation circuit. In the input signal modulator shown in FIG. 5a, a modulation signal a shown in FIG. 3b is impressed to the base of a transistor Tr and an equivalent resistor $R_{Tr}$ between the emitter and collector of the transistor Tr is changed so as to change the ratio $(R_2 + R_{Tr})/(R_1 + R_2 + R_{Tr})$ of a potentiometer composed of resistors $R_1$, $R_2$ and $R_{Tr}$. In this manner, it is possible to obtain an output signal such as shown in FIG. 3c.

Figure 5B:
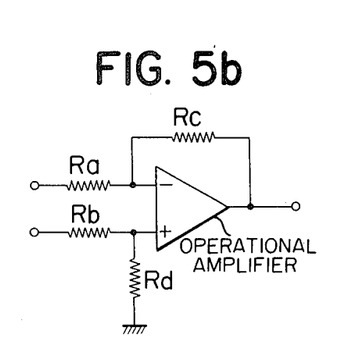

The input signal modulator shown in FIG. 5b on the other hand, uses an operation amplifier including resistors $R_a$, $R_b$, $R_c$ and $R_d$, and the modulation signal a and wheel speed signal $U_{wi}$ such as shown in FIG. 3b are impressed to an inversion input terminal and non-inversion input terminal, respectively, so that a combined output such as shown in FIG. 3c can be obtained in the form of the output of the operational amplifier.

Figure 6:
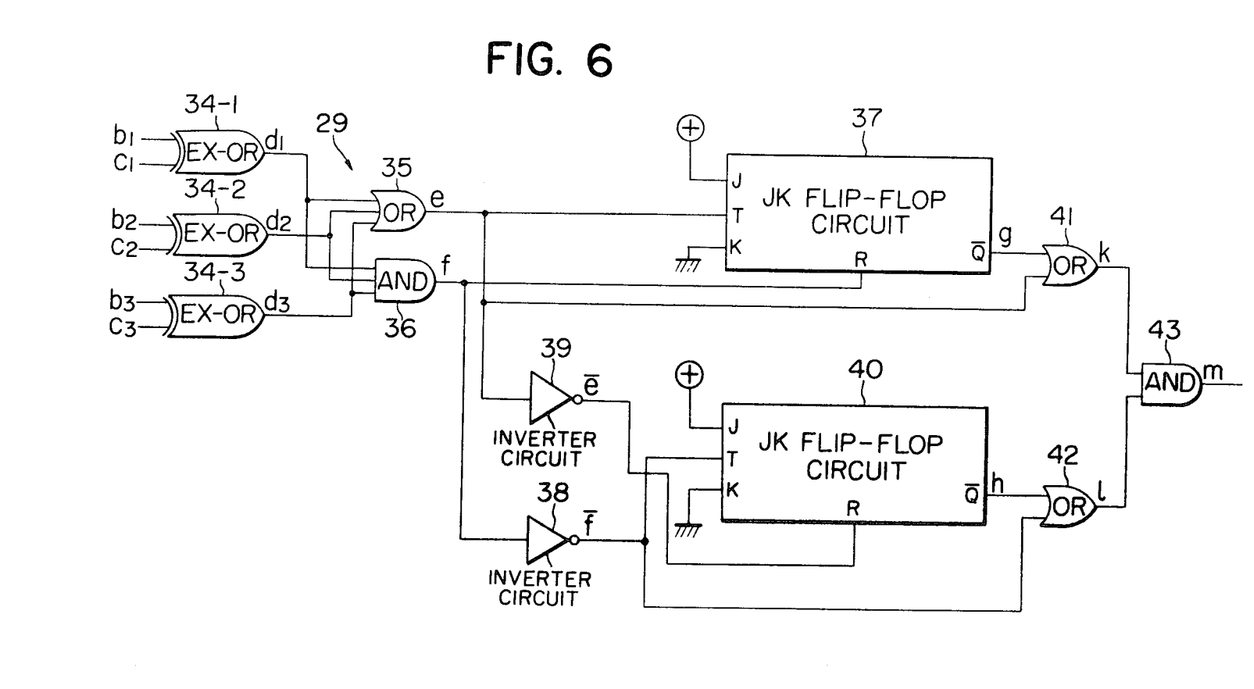
FIG. 6 is a logical circuit diagram showing an example of the trouble diagnosing circuit.

FIG. 6 shows one embodiment of a detailed circuit diagram of the trouble diagnosing circuit 29. The trouble diagnosing circuit 29 comprises three EX-OR (exclusive-OR) circuits 34-1, 34-2 and 34-3 in which the EX-OR circuit 34-1 receives an outlet valve electromagnetic coil voltage signal $b_1$ and an inlet valve electromagnetic coil voltage signal $c_1$ as input signals thereby to produce, as an output signal, an exclusive-OR signal $d_1$ of both signals $b_1$ and $c_1$; the EX-OR circuit 34-2 receives, as input signal, an outlet valve electromagnetic coil voltage signal $b_2$ and an inlet valve electromagnetic coil voltage signal $c_2$ to produce, as an output signal, an exclusive-OR signal $d_2$ of both signals $b_2$ and $c_2$; and the EX-OR circuit 34-3 receives, as input signal, an outlet valve electromagnetic coil voltage signal $b_3$ and an input valve electromagnetic coil voltage $c_3$ to produce, as an output signal, an exclusive-OR signal $d_3$ of both signals $b_3$ and $c_3$.

It should be noted that each of the control logical circuits 26-1, 26-2 and 26-3 is generally composed of a multiplicity of electronic circuit parts and consequently, time widths or pulse widths of output signals produced by these control logical circuits 26-1, 26-2 and 26-3 are not always equal to one another mainly because of non-uniformity of these electronic circuit parts. Assuming now that among the output signals of the three control logical circuits 26-1, 26-2, and 26-3, the output signal of the control logical circuit 26-2 has the largest pulse width and the output signal of the control logical circuit 26-3 has the smallest pulse width, time-changes of the outlet valve electromagnetic coil voltage signals $b_1$, $b_2$ and $b_3$, inlet valve electromagnetic coil voltage signals $c_1$, $c_2$ and $c_3$ and exclusive OR signals $d_1$, $d_2$ and $d_3$ at the time of nonbraking are shown by the solid lines in FIG. 7, respectively.

Turning again to FIG. 6, the exclusive-OR signals $d_1$, $d_2$ and $d_3$ are all fed to an OR circuit 35 as well as to and AND circuit 36. The OR circuit 35 receives the exclusive OR signals $d_1$, $d_2$ and $d_3$ as input signals to produce a signal e as shown by the solid line in FIG. 7 as an output signal, the signal e being fed to a JK flip-flop circuit 37, to an OR circuit 41, and to an inverter circuit 39 as well. The AND circuit 36 also receives the exclusive OR signals $d_1$, $d_2$ and $d_3$ as input signals to produce a signal f as shown by the solid line in FIG. 7 as an output signal, the signal f being fed to the JK flip-flop circuit 37 and to the inverter circuit 38.

Figure 7:
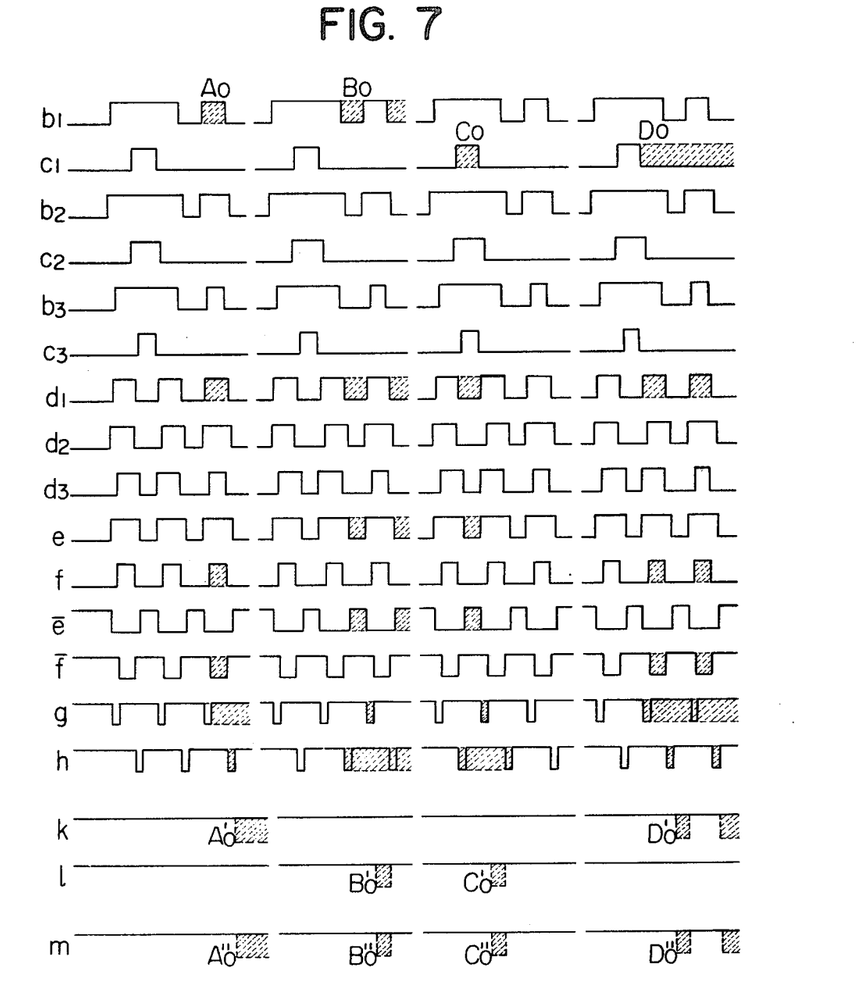
FIG. 7 shows waveforms of the signals produced by the circuit devices shown in FIGS. 2 and 6, respectively.

The inverter circuit 39 receives the signal e to produce, as an output signal, a signal $\bar{e}$ as shown by the solid line in FIG. 7 in a state in which the signal e is inverted, the signal $\bar{e}$ being fed to a JK flip-flop circuit 40. The inverter circuit 39 receives a signal $\bar{f}$ as input signal to produce an inverted signal $\bar{f}$ as shown by the solid line in FIG. 7 as an output signal, the signal $\bar{f}$ being fed to the JK flip-flop circuit 40 and to an OR circuit 42.

The JK flip-flop circuit 37 is of the type having a reset terminal R with a logic signal [1] applied to logic input terminal J and a logic signal [0] applied to terminal K. The flip-flop circuit 37 receives the signal e as an input signal at the clock terminal T and the signal f as an input signal at reset terminal R to produce a signal g as shown by the solid line in FIG. 7 as an output signal from an output terminal $\bar{Q}$. The signal g is produced simultaneously with generation of signal f and extinguished simultaneously with generation of the signal e.

The JK flip-flop circuit 40 has a reset terminal and logic signal [1] is applied to a logic input terminal J and a logic signal [0] is applied to terminal K. The flip-flop circuit 40 receives the signal $\bar{f}$ as an input signal at the clock terminal T and the signal $\bar{e}$ as an input signal at reset terminal R to produce a signal h as shown by the solid line in FIG. 7 as an output signal from an output terminal $\bar{Q}$, the signal h being the inverse of a signal which is produced simultaneously with generation of the signal $\bar{f}$ and extinguished simultaneously with generation of the signal $\bar{e}$ and hence in a state with a signal which is produced simultaneously with generation of the signal $\bar{e}$ and extinguished simultaneously with generation of signal f.

The OR circuit 41 receives, as input signals, a signal e in the form of an output signal of the OR circuit 35 and a signal g of the form of an output signal of the JK flip-flop circuit 37 to produce a signal k as shown by the solid line in FIG. 7 as an output signal. The OR circuit 42 receives as input signals, a signal $\bar{f}$ in the form of an output signal of the inverter circuit 38 and a signal h in the form of an output signal of the JK flip-flop circuit 40 to produce a signal l as shown by the solid line in FIG. 7 as an output signal. The AND circuit 43 receives, as input signals, a signal k in the form of an output signal of the OR circuit 41 and a signal l in the form of an output signal of the OR circuit 42 to produce a signal m as shown by the solid line in FIG. 7.

When any modulation signal a produced by the modulation signal oscillator 28 is fed to the reference wheel speed setting unit 25 and the control logical circuits 26-1, 26-2 and 26-3 through the input signal modulators 23-1, 23-2 and 23-3 as long as the control circuit and each electromagnetic actuator $S_{out\text{-}1, 2, 3}$, $S_{in\text{-}1, 2, 3}$ is in proper operation as shown in FIG. 7, both signals k in the form of an output signal from the OR circuit 41 and signal l in the form of an output signal from the OR circuit 42 form a linear waveform without any defect. Accordingly, the signal m in the form of an output signal of the AND circuit 43 also forms a linear waveform without any defect.

Next, description will be given of the case in which trouble occurs in the operation of the control circuit or of the electromagnetic actuators $S_{out\text{-}1, 2, 3}$, $S_{in\text{-}1, 2, 3}$. Trouble modes of operation for the control circuit or of the electromagnetic actuators are considered to include four cases, that is, failure in the outlet valve electromagnetic coil voltage signal, non-extinction of the outlet valve electromagnetic coil voltage signal, failure in the inlet valve electromagnetic coil voltage signal and non-extinction of the inlet valve electromagnetic coil voltage signal. Assume, for example, that the failure of the outlet valve electromagnetic coil voltage signal occurs at a portion $A_o$ of an outlet valve electromagnetic coil voltage signal $b_1$ in FIG. 7 as shown by the dotted line; the non-extinction of the outlet valve electromagnetic coil voltage signal occurs at a portion $B_o$ of an outlet valve electromagnetic coil voltage signal $b_1$ in FIG. 7 as shown by the dotted line; the failure of the inlet valve electromagnetic coil voltage signal occurs at a portion $C_o$ of the inlet valve electromagnetic coil voltage signal $c_1$ in FIG. 7 as shown by the dotted line; and the non-extinction of the inlet valve electromagnetic coil voltage signal occurs at a portion $D_o$ of an inlet valve electromagnetic coil voltage signal $c_1$ in FIG. 7 as shown by the dotted line. The exclusive-OR signal $d_1$, signals e,f,$\bar{e}$,f, g and h take abnormal waveforms, respectively, as shown by the dotted lines in FIG. 7. Portions $A_o'$ and $D_o'$ of the signal k form a failure of the signal in the portion $A_o$ of the outlet valve electromagnetic coil voltage signal $b_1$ and a failure in signal corresponding to the non-extinction of signal in the portion $D_o$ of the inlet valve electromagnetic coil voltage signal $c_1$, respectively; and portions $B_o'$ and $C_o'$ of the signal l form the non-extinction of signal in the portion $B_o$ of the outlet valve electromagnetic coil voltage signal $b_1$ and the signal failure corresponding to the signal failure in the portion $C_o$ of the inlet valve electromagnetic coil voltage signal $c_1$, respectively. Consequently, the output signal of the AND circuit 43 or the signal m in the form of an outlet signal of the trouble diagnosing circuit 28 forms the signal failures corresponding to the signal failures of the portions $A_o'$, $B_o'$, $C_o'$ and $D_o'$ of the signal k or l, in the portions $A_o''$, $B_o''$, $C_o''$ and $D_o''$, respectively.

Figure 8:
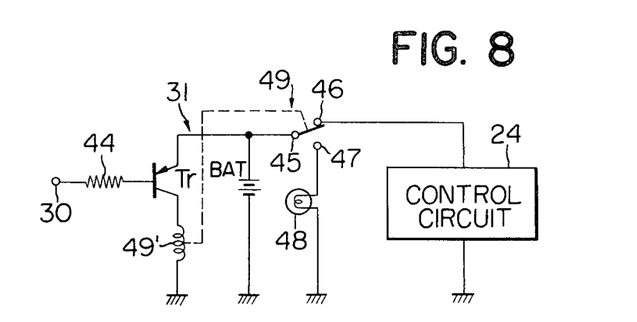
FIG. 8 is a circuit diagram of an embodiment of a power cut-off and alarm generator device.

FIG. 8 shows one detailed embodiment of the power source cut-off and alarm generating device 31. Referring to FIG. 8, a PNP transistor $T_r$ whose base is connected to a normally closed contact 30 through a resistor 44, has its emitter connected to an anode of a power source BAT and also to a contact 45 of a keep or latching relay switch 49. The keep relay switch 49 further comprises a contact 46 grounded through the control circuit 24, and a contact 47 grounded through an alarm 48, such as an alarm lamp, for example. The PNP transistor $T_r$ has its collector grounded through an electromagnetic coil 49' for actuating the keep relay switch 49. When the electromagnetic coil 49' is not energized, the keep relay switch 49 connects the contacts 45 and 46 and opens the contacts 45 and 47. However, once the electromagnetic coil 49' is energized, the keep relay switch 49 opens the contacts 45 and 46 and connects the contacts 45 and 47, after which the condition remains unchanged.

Thus, since, at the time of non-braking, the normally-closed contact 30 is placed in the connection state by the action of the relay switch 33, the signal m in the form of an output signal of the trouble diagnosing circuit 29 is fed to the base of the PNP transistor $T_r$ through the normally-closed contact 30 and the resistor 44. When no trouble occurs in the control circuit 24, no failure is produced in the signal m so that the PNP transistor $T_r$ is in a cut-off state and the electromagnetic coil 49' is not energized. As a result, the anode of the power source BAT is connected to the control circuit 24, whereby the control circuit 24 remains operated properly.

When trouble occurs in the control circuit 24, there is formed a failure in the signal m so that the base potential of the PNP transistor $T_r$ is lowered by the failure portion of the signal m to place the PNP transistor $T_r$ in conduction state, and as a result, the electromagnetic coil 49' is energized, whereby the anode of power source BAT is connected to the alarm 48 so that the latter produces a warning and the control circuit 24 is cut off from the anode of the power source BAT to halt its operation, after which the condition remains unchanged.

Next, the explanation will be given of another embodiment of the present invention.

Figure 9:
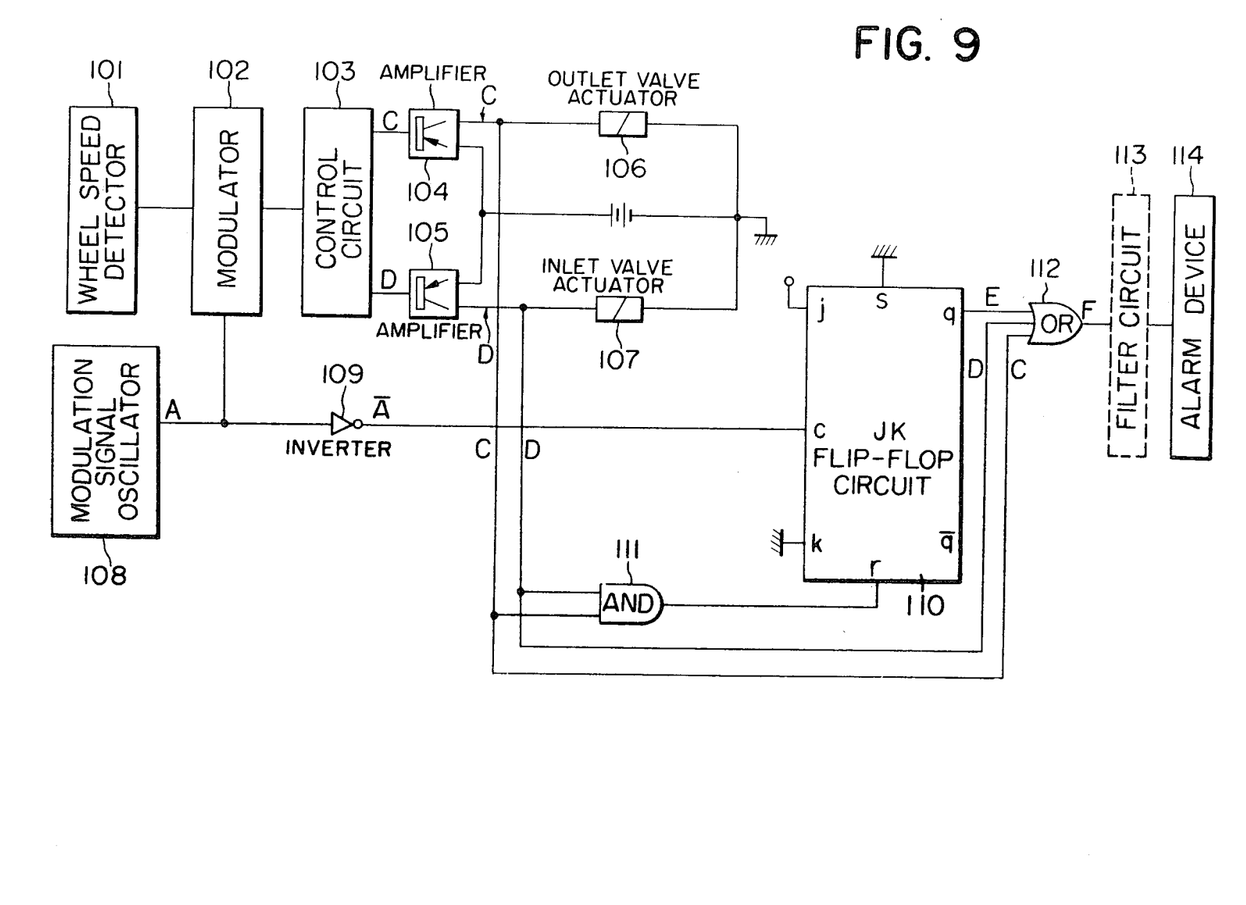
FIG. 9 is a complete circuit diagram of an example of the control system for controlling a single-system anti-skid controller for a vehicle to which the trouble diagnosing device of the present invention is applied.

In FIG. 9, a wheel speed detector 101 for detecting the peripheral speed of the vehicle feeds, as its detection signal, a wheel speed signal $V_w$ in proportion to the peripheral speed of the wheel to a control circuit 103 through a modulator 102. The modulator 102 forms the modulation device of the present invention in cooperation with a modulation signal oscillator 108. Normally, since the modulation signal oscillator 108 does not generate the modulation signal A, the modulator 102 does not modulate the wheel speed signal $V_w$ but feeds the unmodulated signal to the control circuit 103. When trouble of the control circuit system is to be diagnosed, however, the modulation signal oscillator 108 is actuated thereby to let the oscillator 108 generate the modulation signal A, and the modulator 102 modulates the wheel speed signal $V_w$ on the basis of the modulation signal A and the feeds a modulated wheel speed signal $V_w$ to the control circuit 103.

The control circuit 103 generates a pair of control signals C and D that cooperate with each other to produce an anti-skid control, one signal C of these control being fed through an amplifier 104 to an actuator 106 to actuate an outlet valve of an anti-skid controlling oil pressure circuit while the other control signal D being fed through another amplifier 105 to another actuator 107 to actuate an inlet valve of the anti-skid controlling, oil pressure circuit.

Next, the explanation in further detail will be given on an example of the mode of operation of the conventional anti-skid control device for the vehicle. The control circuit 103 has such a construction that the speed of a vehicle is detected in the form of a vehicle speed signal V either directly or by estimation from the peripheral speed of each wheel, and on the basis of this vehicle speed signal V, a reference wheel speed signal $V_R$ is set as function of the vehicle speed signal V. In this construction, a wheel acceleration signal $\dot{V}_w$ is calculated from the wheel speed signal $V_w$ of the wheel subjected to the speed control and this wheel acceleration signal $\dot{V}_w$ is compared with a predetermined reference wheel deceleration signal $-\dot{V}_{w1}$, with a first reference wheel acceleration signal $\dot{V}_{w2}$ and with a second reference wheel acceleration signal $\dot{V}_{w3}$ which is greater than the first reference wheel acceleration signal $\dot{V}_{w2}$, respectively, so that:

(1) when conditions $V_R < V_w$ and $-\dot{V}_{w1} < \dot{V}_w < \dot{V}_{w2}$ or conditions $V_w < V_R$ and $\dot{V}_{w3} < \dot{V}_w$ are satisfied, judgment is so made as to allow free increase in the braking force of the wheel and discrimination waveforms necessary for actuating the actuators 106 and 107 are not formed in the control signals C and D;

(2) when conditions $V_R < V_w$ and $\dot{V}_w < -\dot{V}_{w1}$ or conditions $V_R < V_w$ and $\dot{V}_{w2} < \dot{V}_w < \dot{V}_{w3}$ or conditions $V_w < V_R$ and $-\dot{V}_{w1} < \dot{V}_w < \dot{V}_{w3}$ are satisfied, judgment is so made as to keep the braking force of the wheel constant and a discrimination waveform necessary for actuating the actuator 106 is formed only in the control signal C; and (3) when conditions $V_w < V_R$ and $\dot{V}_w < -\dot{V}_{w1}$ are satisfied, judgment is so made as to decrease the braking force of the wheel and a discrimination waveform necessary for actuating the actuator 106 is formed in the control signal C while a discrimination waveform necessary for actuating the actuator 107 is formed in the control signal D. In accordance with the discrimination waveforms of the respective control signals C and D, the actuators 106 and 107 actuate the corresponding outlet valve and inlet valve thereby to keep constantly the braking force of the wheel to be controlled at a suitable value.

Figure 10:
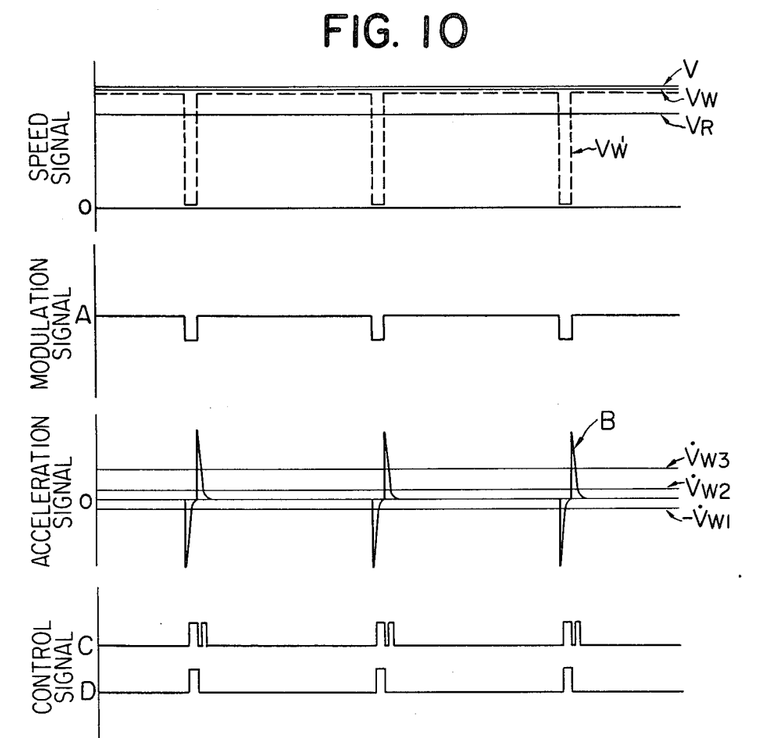
FIGS. 10 and 11 show waveforms of various signals.

Assuming that, in FIG. 10, the vehicle speed signal V, the wheel speed signal $V_w$ and the reference wheel speed signal $V_R$ form smooth waveforms indicated by the solid line, respectively; then, if the wheel signal $V_w$ is modulated in this case on the basis of a modulation signal A forming trouble-diagnosing discrimination waveforms at a predetermined interval and having a rectangular waveform of a relatively narrow width, the wheel speed signal $V_w$ is turned into a modulated wheel speed signal $V_w'$ having a waveform indicated by the dotted line. As a result, an analog wheel acceleration signal B is formed in the control circuit 103 on the basis of the modulated wheel speed signal $V_w'$. Assuming further that, in this case, the control circuit 103 generates the control signals C and D in accordance with the aforementioned conditions (1), (2) and (3), the waveforms of the control signals C and D are such as shown in FIG. 10. In this instance, since delay in action occurs in the various circuits such as the operation circuit forming the control circuit 103, the rising point of the waveform of each control signal C, D or the starting point of the discrimination signal is considerably delayed in comparison with the starting point of the trouble-diagnosing discrimination waveform of the modulation signal A. The interrelation between these modulation signal A and control signals C and D is shown in magnification by the solid line in FIG. 11.

Referring again to FIG. 9, the modulation signal A oscillated by the modulation signal oscillator 108 is branched before it reaches the modulator 102 and is fed to an inverter 109, where the modulation signal A is inverted in the form of an inversion signal $\overline{A}$ which is then fed to the terminal c of a J-K flip-flop circuit 110. The control signals C and D flowing through the amplifiers 104 and 105 are branched before they reach the respective actuators 106 and 107 and are fed to an AND circuit 111. An output signal of AND circuit 111 is fed to terminal r of the J-K flip-flop circuit 110. The J-K flip-flop circuit 110 produces, as an output signal, a discrimination waveform signal E shown by the solid line in FIG. 11 from its terminal q. The signal E starts forming a discrimination waveform at the starting point of the discrimination waveform of the modulation signal A and hence, at the starting point of the discrimination waveform of the inversion signal $\overline{A}$, and finishes forming the discrimination waveform at the starting point of the discrimination waveform of the output signal of the AND circuit 111. This output signal E is fed to an OR circuit 112. The OR circuit receives further, as input signals, the control signals C and D and produces, as an output signal, a discrimination waveform signal F shown by the solid line in FIG. 11.

The discrimination waveform signal F generated by the OR circuit 112 is fed, through a filter circuit 113 for removing signal noise, to an alarm device 114 which raises an alarm by a buzzer or by a warning lamp only when the discrimination waveform signal F continues to form the discrimination waveform beyond a predetermined period of time.

The trouble diagnosing device shown in FIG. 9 has the construction as described above. For diagnosing a control circuit system consisting of the control circuit 103 and the amplifiers 104 and 105, the modulation signal A is first oscillated by the modulation signal oscillator 108. So long as no trouble occurs in the control circuit system, the control signals C and D, the discrimination waveform signal E as the output signal of the flip-flop circuit 110 and the discrimination waveform signal F as the output signal of the OR circuit 112 take the waveforms indicated by the solid lines in FIG. 11, respectively. Since the discrimination waveform of the discrimination waveform signal F does not continue to exceed a given period, the alarm device 114 raises no alarm.

Figure 11:
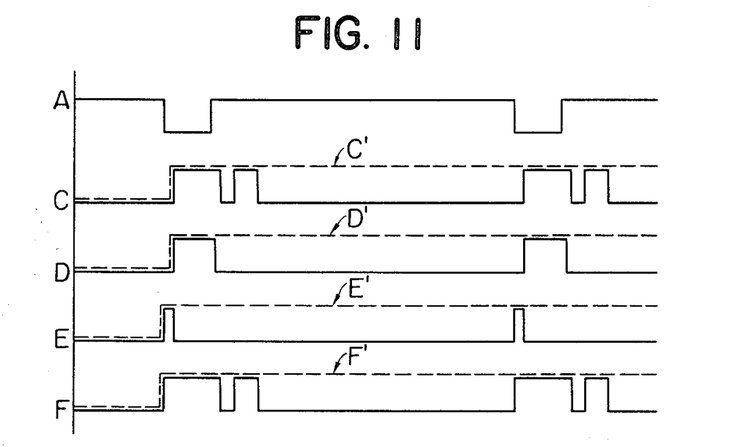

If such a trouble occurs in the control circuit system that there are not at all formed the control signal waveforms required for actuating the actuators 106 and 107, the AND circuit 111 produces no output signal at all and as a result, the J-K flip-flop circuit 110 generates a discrimination waveform signal E' such as indicated by the dotted line in FIG. 11 and along therewith, the OR circuit 112 generates a discrimination waveform signal F' such as indicated by the dotted line in FIG. 11. Since this discrimination waveform signal F' continues to form the discrimination waveform over a given period, the alarm device 114 raises an alarm this time.

If such a trouble occurs in the control circuit system that, though the control signal waveforms required for actuating the actuators 106 and 107 are actually formed, these waveforms are kept formed even if the time cones at which the operations of the actuators must be stopped, the discrimination waveform signal C' or D' is generated from the amplifier 104 or 105 as indicated by the dotted line in FIG. 11. As a result, the OR circuit 112 produces a discrimination waveform signal F' such as shown by the dotted line in FIG. 11. As this discrimination waveform signal F' keeps forming the discrimination waveform to exceed a given period, the alarm device 114 raises an alarm.

When any trouble occurs somehow due to braking, short-circuit or the like of the control circuit system, the alarm device 114 immediately raises an alarm and hence, it is possible to know the trouble and to immediately take necessary measures.

At this time, in case the width of the discrimination waveform of the modulation signal A or its pulse width be set so small that even if the control signals C and D, including discrimination waveforms of small pulse widths produced through modulation of the wheel speed signal Vw by the modulation signal A, are fed to the respective actuators 106,107, the actuators can not respond to such small pulse widths of the discrimination waveforms of the control signals C and D, it is possible to diagnose at any time during braking or nonbraking trouble in the control circuit system composed of the control circuit 103 and the amplifiers 104 and 105 by means of the modulation signal A emitted from the modulation signal oscillator 108 without inducing faulty operation of the respective actuators.

In accordance with the trouble diagnosing device of the present invention it is also possible to diagnose troubles of the wheel speed detector 101 shown in FIG. 9 or the actuators 106 and 107 shown in FIG. 9 arising from breaking or short-circuiting of component circuit parts.

If the control circuit system is of such a type that generates a signal control signal, the AND circuit 111 shown in FIG. 9 becomes unnecessary.

Figure 12:
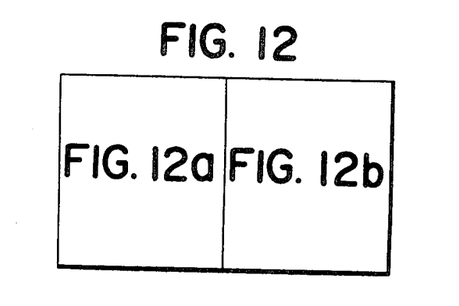
FIG. 12 shows the association of FIGS. 12a and 12b.

FIG. 12 shows an embodiment of the trouble diagnosing device of the present invention adapted to each control circuit of a number of anti-skid control devices provided to a number of respective wheels independently of each other.

In this embodiment, wheel speed signals $V_{w1}$, $V_{w2}$, and $V_{w3}$ in the form of the output signals of three wheel speed detectors 101-1, 101-2 and 101-3, each having the same function as the wheel speed detector 101 shown in FIG. 9, are fed to control circuits 103-1, 103-2 and 103-3, each having the same function as the control circuit 103 in FIG. 9, through respective modulators 102-1, 102-2 and 102-3. The control circuits 103-1, 103-2 and 103-3 generate control signals $C_1$, $D_1$; $C_2$, $D_2$; and $C_3$, $D_3$, respectively, and feed these control signals through respective amplifiers 104-1, 105-1; 104-2, 105-2; and 104-3, 105-3 to actuators 106-1, 107-1; 106-2, 107-2; and 106-3, 107-3, each actuator having the same function as the actuators 106 and 107 shown in FIG. 9.

The modulation signal A generated by the moduation signal oscillator 108' and shown in FIG. 10 is fed to each modulator 102-1, 102-2, 102-3 to change each wheel speed signal $V_{w1}$, $V_{w2}$, $V_{w3}$ into each modulated wheel speed signal $V_{w1}'$, $V_{w2}'$, $V_{w3}'$ and is also fed after having been inverted by an inverter 109' into an inversion signal $\overline{A}$ to a terminal c of a J-K flip-flop circuit 110' having the same function as the J-K flip-flop circuit 110 shown in FIG. 9.

The control signals $C_1$, $D_1$; $C_2$, $D_2$; and $C_3$, $D_3$ passing through the respective amplifiers 104-1, 105-1; 104-2, 105-2; and 104-3, 105-3 are fed to an AND circuit 111' and to an OR circuit 112', as well. The output signal of the AND circuit 111' is fed to terminal r of the J-K flip-flop circuit 110', and the output signal of this flip-flop circuit 110' is fed to the OR circuit 112' as a discrimination waveform signal E such as shown by the solid line in FIG. 11 so long as no trouble occurs in the control circuit system. In this instance, the OR circuit 112' feeds, as its output signal, a discrimination waveform signal F shown by the solid line in FIG. 11 to an AND circuit 115.

In addition to the output signal of the OR circuit 112', the abovementioned AND circuit 115 receives, through a terminal 116, a braking signal G that is cut off only at the time of braking by the action of a switch 118 operatively connected with the brake device and also receives, through a terminal 117, a low speed signal H that is cut off only when the vehicle speed is lower than a set speed, to feed its output signal to an alarm device 114' having the same function as the alarm device shown in FIG. 9.

Generally speaking, a great fluctation tends to occur between the respective peripheral speeds of the wheels or in revolution of the wheels at the time of braking or at the low speed running of the vehicle so that the wheel speed signals $V_{w1}$, $V_{w2}$ and $V_{w3}$ form unstable waveforms whereby possibility of wrong diagnosis occurs if the trouble of the control circuit system is diagnosed under such a state. However, wrong diagnosis at the time of braking or of low speed running of the vehicle can be avoided by using the braking signal G and low speed signal H as the input signals to the AND circuit 115.

Figure 12A:
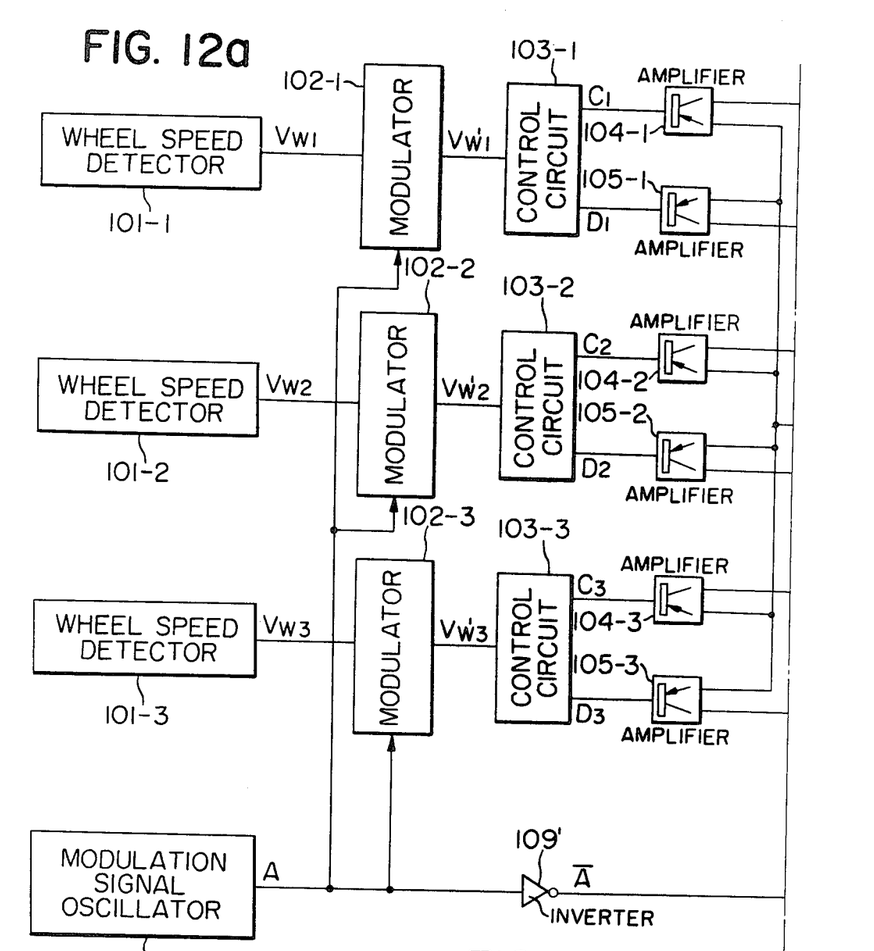
FIG. 12a is one half of a complete circuit diagram of an example of the control circuit system for controlling a multiple-system anti-skid controller for a vehicle to which the trouble diagnosing device of the present invention is applied.
Figure 12B:
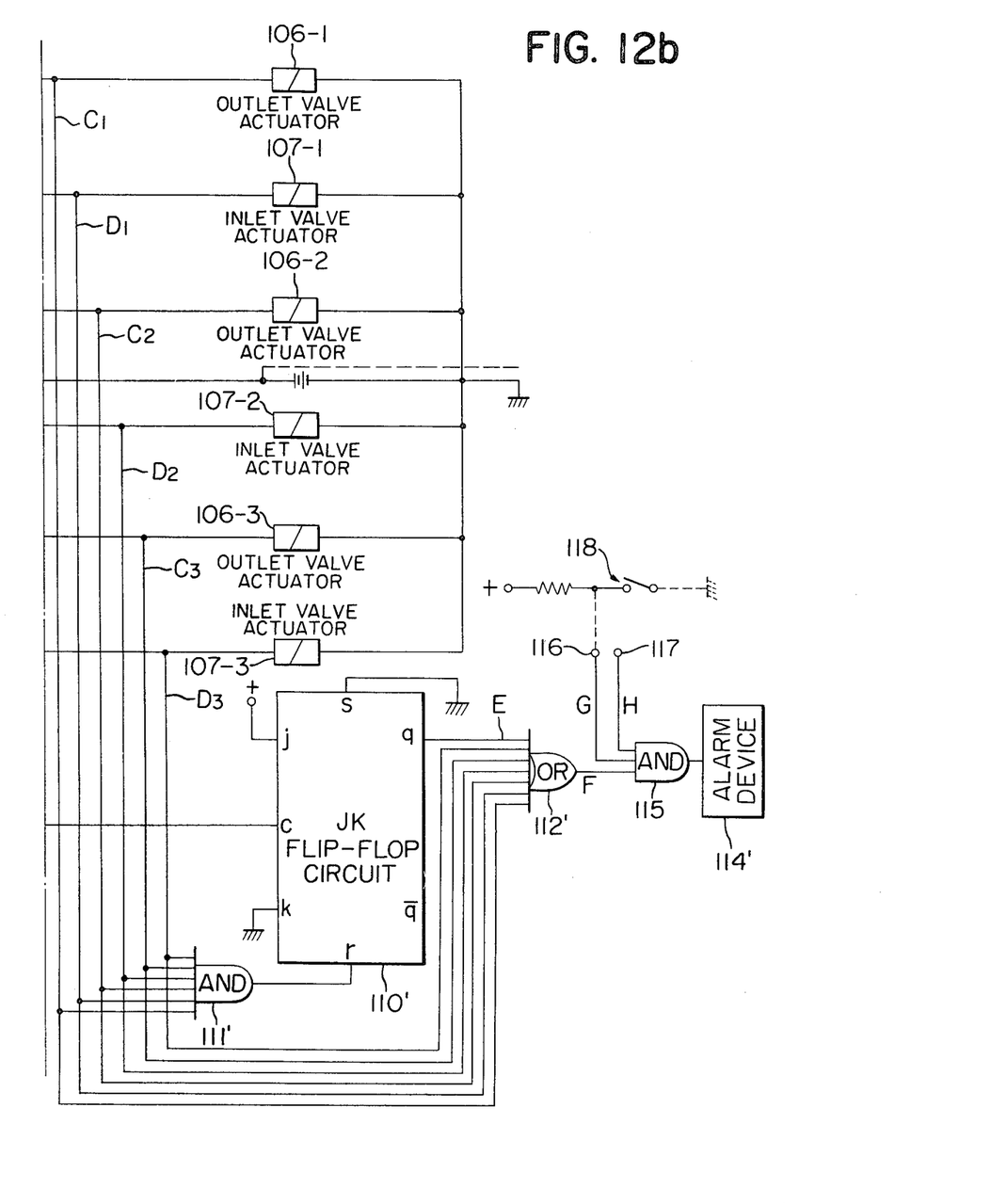
FIG. 12b is the other half of the same.

As the trouble diagnosing device shown in FIGS. 12a and 12b has the above-described construction, the alarm device 114' raises no alarm so long as no trouble occurs in the control circuit system. Even if the modulation signal oscillator 108' generates the modulation signal A during braking or low speed running of the vehicle, the alarm device 114' is free from generating an alarm on the basis of wrong diagnosis because the AND circuit 115 produces no output signal.

If trouble occurs in the control circuit system at the time of braking under such a state where the vehicle speed exceeds a set speed, the modulation signal oscillator 108' produces the modulation signal A and hence, a discrimination waveform signal F' shown by the dotted line in FIG. 11 is produced as an output signal in the OR circuit 112' thereby to let the alarm device 114' raise an alarm. Accordingly, it is possible in this case to immediately notice the trouble of the control circuit system and to rapidly take necessary counter-measures.

Other embodiments and modifications of the present invention will suggest themselves to those skilled in the art and all such as come within the spirit of this invention are included within its scope as best defined by the appended claims.

What is claimed is:

1. In a control system, a trouble diagnosing device for diagnosing trouble in a control circuit or in an actuator wherein said control circuit receives an input signal representative of information about a controlled means which is controlled by the actuator and transmits controlling indicia to the actuator for controlling the operation of the controlled means; said trouble diagnosing device comprising:

a modulation signal means for feeding to the input side of the control circuit a trouble diagnosing signal having such a narrow pulse width that the actuator is not able to respond thereto, said trouble diagnosis signal being independent of the input signal related to the controlled means;

input signal modulator means for modulating the input signal related to the controlled means by the trouble diagnosing signal to produce a modulation signal; and a trouble diagnosing circuit means for producing output signals indicating trouble in the control circuit or in the actuator when the control circuit or the actuator receives the modulation signal from said input signal modulator and in response thereto emits a signal having other than a predetermined waveform.

2. In a trouble diagnosing device of a control system for receiving, as input signals, detection signals formed by detecting conditions of controlled means which are representative of the conditions of said controlled means, and for feeding after logical operation to actuator means as output signals, control signals for actuating the actuator means so as to properly control the operations of the controlled means, said trouble diagnosing device comprising:

modulator means for modulating said detection signals by a modulation signal having a trouble diagnosing discrimination waveform;

first circuit means for producing a discrimination waveform signal including a discrimination waveform which starts at the starting point of the discrimination waveform of the modulation signal produced by said modulator means and ends at the starting point of the discrimination waveforms of the control signal occurring as the detection signals are modulated by said modulator means;

second circuit means for producing a discrimination waveform signal including a discrimination waveform which is present as long as at least one of the control signals and said discrimination signal produced by said first circuit means is forming a discrimination waveform; and alarm means for raising an alarm when said discrimination waveform signal produced by said second circuit means keeps forming continuously the discrimination waveform over a predetermined period of time.

3. In a trouble diagnosing device of a control system for receiving, as input signals, detection signals formed by detecting conditions of controlled means, and for feeding after logical operation to a plurality of actuator means, as output signals, control signals for actuating the actuator means so as to perperly control, in cooperation with one another, the operation of the controlled means, said trouble diagnosing device comprising:

modulator means for modulating the detection signals by a modulation signal having a trouble diagnosing discrimination waveform;

first circuit means for producing a discrimination waveform signal including a discrimination waveform which is present when the control signals fed to the actuator means all have discrimination waveforms;

second circuit means for producing a discrimination waveform signal including a discrimination waveform which starts at the starting point of the discrimination waveform of the modulation signal produced by said modulator means and ends at the starting points of the discrimination waveform of the output signal of said first circuit means occurring when the detection signals are modulated by said modulator means;

third circuit means for producing a discrimination waveform signal including a discrimination waveform which is present as long as at least one of the control signals and the discrimination waveform signal produced by said second circuit means is forming a discrimination waveform; and alarm means for raising an alarm when the discrimination waveform signal produced by said third circuit means keeps forming continuously the discrimination waveform over a predetermined period time.

4. In a trouble diagnosing device of a multiple control system provided independently to a plurality of controlled means, for receiving, as input signals, detection signals formed by detecting conditions of the respective controlled means and thus representative of the conditions of the controlled means, and for feeding after logical operation, as output signals, control signals to a plurality of actuator means at least one of which is provided to each of the controlled means so as to properly control the operations of the controlled means, said trouble diagnosing device comprising:

modulator means for modulating the detection signals by a modulation signal having a trouble diagnosing discrimination waveform;

first circuit means for producing a discrimination waveform signal including a discrimination waveform which is present only when all of the control signals fed to the actuator means form discrimination waveforms;

second circuit means for producing a discrimination waveform signal including a discrimination waveform which starts at the starting point of the discrimination waveform of said modulation signal produced by said modulator means and ends at the starting point of the discrimination waveform of the output signal of said first circuit means occurring when the detection signals are modulated by said modulator means;

third circuit means for producing a discrimination waveform signal including a discrimination waveform which is present as long as at least one of the control signals and the discrimination waveform signal produced by said second circuit means is forming the discrimination waveform; and alarm means for raising an alarm when the discrimination waveform signal produced by said third circuit means keeps forming continuously the discrimination waveform over a predetermined period of time.

5. The trouble diagnosing device as defined in claims 2 or 3 or 4 wherein the controlled means are wheels of a vehicle, the detection signals are signals representing the peripheral speed of said wheels and the actuator means are actuators for anti-skid controllers of said wheels.

6. The trouble diagnosing device as defined in claim 5 wherein said alarm means are so constructed as to raise an alarm only when a first signal adapted to be cut off only at the time of braking and a second signal adapted to be cut off only when the speed of the vehicle is below a set value are present.

7. The trouble diagnosing device as defined in claim 5 wherein said alarm means are so constructed as to receive input signals via a filter circuit for removing signal noise which would cause a wrong diagnosis.

8. In a control system as defined in claim 1, wherein said trouble diagnosing circuit means comprises three exclusive-OR gates; a first OR gate having three inputs each connected to one output of said exclusive-OR gates; a first AND gate having three inputs each connected to one output of said exclusive-OR gates; a first bi-stable circuit with input connected to an output of said first OR gate; a second bi-stable circuit with input connected to an output of said AND gate through inverter means; second OR gates connected to outputs of said bi-stable circuits; and a second AND with inputs connected to the outputs of said second OR gates.

9. In a trouble diagnosing device as defined in claim 2, including modulator signal oscillator means; bi-stable circuit means with input connected to the output of said modulator signal oscillator means, said oscillator means being also connected to said modulator means; wheel speed detector means connected to said modulator means; control circuit means with input connected to the output of said modulator means and having two outputs connected to valve actuators and to an AND gate, said AND gate having an output connected to said bi-stable circuit means; and an OR gate with three inputs, one of said three inputs being connected to the output of said bi-stable circuit means, and the other two inputs of said OR gate being connected to respective outputs of said control circuit means.

10. In a trouble diagnosing device as defined in claim 2, including three wheel speed detectors, three modulators with inputs connected to outputs of said detectors; modulation signal oscillator means with output connected to said three modulators; bi-stable circuit means having an input connected to the output of said oscillator means; three control circuits each connected to an output of said modulators, each control circuit having two outputs connected to two valve actuators; a first AND gate with inputs connected to the outputs of said control circuits, said first AND gate having an output connected to said bi-stable circuit means; a first OR gate with inputs connected to the outputs of said control circuits, said OR gate having also an input connected to an output of said bi-stable circuit means.

* * * * *